United States Patent
Jiang et al.

(10) Patent No.: US 10,098,031 B2
(45) Date of Patent: Oct. 9, 2018

(54) REFERENCE SIGNAL RECEIVING QUALITY REPORTING METHOD AND DEVICE

(71) Applicant: China Mobile Communications Corporation, Beijing (CN)

(72) Inventors: Xiaowei Jiang, Beijing (CN); Nan Hu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 0 days.

(21) Appl. No.: 15/513,305

(22) PCT Filed: Jun. 16, 2015

(86) PCT No.: PCT/CN2015/081539
§ 371 (c)(1),
(2) Date: Mar. 22, 2017

(87) PCT Pub. No.: WO2016/045418
PCT Pub. Date: Mar. 31, 2016

(65) Prior Publication Data
US 2017/0311193 A1    Oct. 26, 2017

(30) Foreign Application Priority Data
Sep. 22, 2014 (CN) .......................... 2014 1 0488501

(51) Int. Cl.
*H04L 5/00* (2006.01)
*H04W 24/10* (2009.01)
(Continued)

(52) U.S. Cl.
CPC .......... *H04W 24/10* (2013.01); *H04B 17/318* (2015.01); *H04L 5/0048* (2013.01); *H04W 72/0413* (2013.01)

(58) Field of Classification Search
CPC .............. H04W 24/10; H04W 72/0413; H04B 17/318; H04L 5/0048
See application file for complete search history.

(56) References Cited

U.S. PATENT DOCUMENTS

2009/0247150 A1    10/2009  Fischer et al.
2011/0199923 A1    8/2011   Persson et al.
(Continued)

FOREIGN PATENT DOCUMENTS

CN    102036296 A    4/2011
CN    102238585 A    11/2011
(Continued)

OTHER PUBLICATIONS

Written Opinion for International Patent Application No. PCT/CN2015/081539, dated Sep. 23, 2015, English translation, 5 pages.
(Continued)

*Primary Examiner* — Syed Haider
(74) *Attorney, Agent, or Firm* — Mintz Levin Cohn Ferris Glovsky and Popeo, P.C.; Kongsik Kim; Jhongwoo Jay Peck

(57) ABSTRACT

Disclosed is a Reference Signal Receiving Quality (RSRQ) reporting method and device. In the method, RSRQ measurement is performed, and an adopted RSRQ measurement type for the RSRQ measurement is recorded; and the adopted RSRQ measurement type and an RSRQ measurement result under the RSRQ measurement type are reported.

17 Claims, 7 Drawing Sheets

(51) Int. Cl.
*H04B 17/318* (2015.01)
*H04W 72/04* (2009.01)

(56) References Cited

U.S. PATENT DOCUMENTS

| | | | |
|---|---|---|---|
| 2012/0314604 A1* | 12/2012 | Siomina | H04W 64/00 370/252 |
| 2013/0301422 A1* | 11/2013 | Caretti | H04B 1/1027 370/241 |
| 2013/0343217 A1 | 12/2013 | Pan et al. | |
| 2014/0128057 A1* | 5/2014 | Siomina | H04J 3/0685 455/423 |
| 2015/0289156 A1 | 10/2015 | Jung et al. | |
| 2016/0242052 A1* | 8/2016 | Kazmi | H04W 24/10 |

FOREIGN PATENT DOCUMENTS

| | | |
|---|---|---|
| CN | 102752787 A | 10/2012 |
| CN | 103237317 A | 8/2013 |
| CN | 103237322 A | 8/2013 |
| CN | 103581989 A | 2/2014 |
| EP | 2922334 A1 | 9/2015 |
| WO | 2013047833 A1 | 4/2013 |
| WO | 2014068532 A1 | 5/2014 |
| WO | WO-2014/077658 A1 | 5/2014 |

OTHER PUBLICATIONS

Nokia Corporation, Nokia Networks, "Impacts of new RSRQ definition", 3GPP TSG-RAN WG2#87 R2-143428, 3GPP, mailed on Aug. 8, 2014, 3 pages.

Supplementary European Search Report in European Application No. 15844811.8 dated Dec. 22, 2017.

"3rd Generation Partnership Project; Technical Specification Group Radio Access Network; Evolved Universal Terrestrial Radio Access (E-UTRA); Physical layer; Measurements (Release 11)", 3GPP Draft; 36214-B10, 3rd Generation Partnership Project (3GPP), Mobile Competence Centre; 650, Route Des Lucioles; F-06921 Sophia-Antipolis Cedex; France, Dec. 15, 2012 (Dec. 15, 2012).

* cited by examiner (Related Art)

REFERENCE SIGNAL RECEIVING QUALITY REPORTING METHOD AND DEVICE

CROSS-REFERENCE TO RELATED APPLICATIONS

This application is a U.S. national phase of International Application No. PCT/CN2015/081539, filed on Jun. 16, 2015, which claims priority to Chinese Application No. 201410488501.9 filed on Sep. 22, 2014, which applications are incorporated herein by reference.

TECHNICAL FIELD

The disclosure relates to the technical field of communications, and more particularly to a Reference Signal Receiving Quality (RSRQ) reporting method and device.

BACKGROUND

Along with development of the mobile communication technology, a scale of a mobile communication network becomes increasingly large, and users' requirement on quality of a service in the mobile communication network also becomes higher. Therefore, network parameter optimization and improvement of quality of service of the network have become an important research direction of development of the mobile communication network.

Drive test may reflect a condition of the network, and plays a direct role in measurement and evaluation of a performance index of the network. At present, drive test is an important means for network optimization of an operator. Conventional drive tests are usually performed manually, which require huge human and material resources. In order to solve the problem, the 3rd Generation Partnership Project Release 9 (3GPP R9) starts making researches on Minimization of Drive Test (MDT). As shown in FIG. 1, in the MDT, a User Equipment (UE) automatically performs drive test and records data and a base station collects and reports the drive test data to a network manager, so as to accomplish the data measurement and collection work. Compared with conventional drive test, the MDT may reduce the drive test overhead and shorten the optimization period, thereby reducing network optimization and maintenance cost at a network management side.

In the MDT, Reference Signal Receiving Quality (RSRQ) is an important parameter to be reported by the UE. With a conventional type of RSRQ measurement, the UE performs RSRQ measurement on a relatively smaller bandwidth. In the 3rd Generation Partnership Project Release 11 (3GPP R11), wideband RSRQ measurement is introduced, and with this type of measurement, the UE performs RSRQ measurement on a relatively larger bandwidth. Compared with narrowband RSRQ measurement, wideband RSRQ measurement may reflect quality of a network signal better, and a handover threshold value set for cell selection or reselection by a network side according to a wideband RSRQ measurement value may be different from a handover threshold value set according to a narrowband RSRQ measurement value. With the conventional type of RSRQ measurement, a denominator of a defined RSRQ, i.e. a Received Signal Strength Indicator (RSSI), is measured and determined on the basis of an Orthogonal Frequency Division Multiplexing (OFDM) symbol which is received on an antenna port 0 and has a reference symbol. In the 3rd Generation Partnership Project Release 12 (3GPP R12), a Newly-defined RSRQ is introduced, in which the RSSI is measured on the basis of all received OFDM symbols. Measurement error may be reduced by performing RSRQ measurement with the newly-defined RSRQ.

At present, in a conventional RSRQ measurement result reporting manner, after receiving an RSRQ measurement result, a network management side does not know whether the measurement result is obtained on the basis of newly-defined RSRQ or obtained on the basis of conventionally-defined RSRQ, and may does not know whether the measurement result is obtained on the basis of wideband RSRQ measurement or obtained on the basis of narrowband RSRQ measurement, either, resulting in that an actual meaning represented by the received RSRQ measurement result cannot be parsed, and network optimization cannot be effectively performed according to the RSRQ measurement result.

SUMMARY

Embodiment of the disclosure provide an RSRQ reporting method and device, in order to solve the problem in the related art that a network management side cannot parse an actual meaning represented by the received RSRQ measurement result and thus cannot effectively perform network optimization according to an RSRQ measurement result.

The embodiment of the disclosure provides an RSRQ reporting method, which may include that:

RSRQ measurement is performed, and an adopted RSRQ measurement type for the RSRQ measurement is recorded; and the adopted RSRQ measurement type and an RSRQ measurement result under the RSRQ measurement type are reported.

Optionally, the RSRQ measurement type may include a bandwidth type and/or a defined type, wherein the bandwidth type may include wideband RSRQ and narrowband RSRQ, the defined type may include conventionally-defined RSRQ and newly-defined RSRQ, RSSI measurement may be performed on the basis of an OFDM symbol which is received on an antenna port 0 and has a reference symbol in the conventionally-defined RSRQ, and RSSI measurement may be performed on the basis of all received OFDM symbols in the newly-defined RSRQ.

Optionally, the RSRQ measurement type may include a bandwidth type and a defined type; and the step that the adopted RSRQ measurement type is reported may include that:

the adopted bandwidth type and defined type are indicated by a multibit Information Element (IE); or, the adopted bandwidth type and defined type are indicated by different IEs respectively; or the adopted RSRQ measurement type is indicated to be a combination of the wideband RSRQ and the newly-defined RSRQ by a single-bit IE, or, the adopted RSRQ measurement type is indicated to be a combination of the narrowband RSRQ and the conventionally-defined RSRQ by a single-bit IE.

Optionally, before the step that RSRQ measurement is performed, the method may further include that:

the RSRQ measurement type indicated by the base station through a Radio Resource Control (RRC) message is received; and/or, the RSRQ measurement type indicated by the base station through a broadcast message is received.

Optionally, the step that RSRQ measurement is performed and the adopted RSRQ measurement type is recorded may include that:

the adopted RSRQ measurement type is recorded according to received logged MDT configuration information when the RSRQ measurement result is recorded in an idle state.

Optionally, the step that the adopted RSRQ measurement type is reported may include that:

a logged measurement report (logMeasReport) IE is reported through an RRC message, and the RSRQ measurement type is indicated in the logMeasReport IE.

Optionally, the step that RSRQ measurement is performed and the adopted RSRQ measurement type is recorded may include that:

the RSRQ measurement result is recorded in case of any one of a Radio Link Failure (RLF), a handover failure and a connection establishment failure, and the adopted RSRQ measurement type is recorded.

Optionally, the step that RSRQ measurement is performed and the adopted RSRQ measurement type is recorded may include that:

RSRQ measurement is performed under multiple RSRQ measurement types, and RSRQ measurement results under each RSRQ measurement type are recorded respectively.

Another embodiment of the embodiment of the disclosure provides an RSRQ reporting method, which may include that:

an RSRQ measurement result reported by UE is received; and the RSRQ measurement result reported by the UE and an RSRQ measurement type adopted by the UE are reported to a Trace Collection Entity (TCE).

Optionally, the RSRQ measurement type may include a bandwidth type and/or a defined type, wherein the bandwidth type may include wideband RSRQ and narrowband RSRQ, the defined type may include conventionally-defined RSRQ and newly-defined RSRQ, RSSI measurement may be performed on the basis of an OFDM symbol which is received on an antenna port 0 and has a reference symbol in the conventionally-defined RSRQ, and RSSI measurement may be performed on the basis of all received OFDM symbols in the newly-defined RSRQ.

Optionally, the RSRQ measurement type may include a bandwidth type and a defined type; and the step that the RSRQ measurement type adopted by the UE is reported to the TCE may include that:

the bandwidth type and defined type adopted by the UE are indicated by a multibit IE; or, the bandwidth type and defined type adopted by the UE are indicated by different IEs respectively; or the RSRQ measurement type adopted by the UE is indicated to be a combination of the wideband RSRQ and the newly-defined RSRQ by a single-bit IE, or, the RSRQ measurement type adopted by the UE is indicated to be a combination of the narrowband RSRQ and the conventionally-defined RSRQ by a single-bit IE.

Optionally, before the step that the RSRQ measurement result reported by the UE is received, the method may further include that:

the RSRQ measurement type is indicated to the UE in a connected state through an RRC message; and/or, the RSRQ measurement type is indicated to UE under coverage through a broadcast message.

Optionally, if the RSRQ measurement type is issued to the UE in the connected state through the RRC message, the step that the RSRQ measurement result reported by the UE and the RSRQ measurement type adopted by the UE are reported to the TCE may include that:

the RSRQ measurement result reported by the UE and the RSRQ measurement type indicated to the UE before are reported to the TCE.

Optionally, the step that the RSRQ measurement result reported by the UE is received may include that:

the RSRQ measurement type reported by the UE and the RSRQ measurement result under the RSRQ measurement type are received.

Optionally, before the step that the RSRQ measurement result reported by the UE is received, the method may further include that:

the RSRQ measurement type of the UE is configured; or, the RSRQ measurement type transmitted by a network Entity Management (EM) is received.

Optionally, the step that the RSRQ measurement type transmitted by the EM is received may include that:

MDT configuration information including the RSRQ measurement type is received from the EM; or, RLF report configuration information or connection establishment failure report configuration information including the RSRQ measurement type is received from the EM.

Another embodiment of the disclosure provides an RSRQ reporting method, which may include that:

an RSRQ measurement type is configured; and the configured RSRQ measurement type is indicated to a base station for the base station to indicate to UE.

Optionally, the RSRQ measurement type may include a bandwidth type and/or a defined type, wherein the bandwidth type may include wideband RSRQ and narrowband RSRQ, the defined type may include conventionally-defined RSRQ and newly-defined RSRQ, RSSI measurement may be performed on the basis of an OFDM symbol which is received on an antenna port 0 and has a reference symbol in the conventionally-defined RSRQ, and RSSI measurement may be performed on the basis of all received OFDM symbols in the newly-defined RSRQ.

Optionally, the RSRQ measurement type may include a bandwidth type and/or a defined type; and the step that the configured RSRQ measurement type is indicated to the base station may include that:

the configured bandwidth type and defined type are indicated by a multibit IE; or, the configured bandwidth type and defined type are indicated by different IEs respectively; or the configured RSRQ measurement type is indicated to be a combination of the wideband RSRQ and the newly-defined RSRQ by a single-bit IE, or, the configured RSRQ measurement type is indicated to be a combination of the narrowband RSRQ and the conventionally-defined RSRQ by a single-bit IE.

Optionally, the step that the configured RSRQ measurement type is indicated to the base station may include that:

the RSRQ measurement type is indicated to the base station through MDT configuration information; or, the RSRQ measurement type is indicated to the base station through RLF report configuration information or connection establishment failure report configuration information.

The embodiment of the disclosure provides an RSRQ reporting device, which may include:

a measurement module, configured to perform RSRQ measurement, and record an adopted RSRQ measurement type for the RSRQ measurement; and a sending module, configured to report the adopted RSRQ measurement type and an RSRQ measurement result under the RSRQ measurement type.

Another embodiment of the disclosure provides an RSRQ reporting device, which may include:

a receiving module, configured to receive an RSRQ measurement result reported by a UE; and a sending module, configured to report the RSRQ measurement result reported by the UE and an RSRQ measurement type adopted by the UE to a TCE.

Another embodiment of the disclosure provides an RSRQ reporting device, which may include:

a configuration module, configured to configure an RSRQ measurement type; and a sending module, configured to indicate the configured RSRQ measurement type to a base station, so as for the base station to indicate the RSRQ measurement type to UE.

In the embodiment of the disclosure, the UE simultaneously reports the RSRQ measurement type and the RSRQ measurement result, so that the base station may report the RSRQ measurement type reported by the UE to a network management side, and the network management side may parse the RSRQ measurement result of the UE on the basis of the RSRQ measurement type adopted by the UE, and may effectively perform network optimization according to the parsed RSRQ measurement result.

In addition, in the embodiment of the disclosure, the UE which is kept in connection with the base station all the time may not report the RSRQ measurement type after performing RSRQ measurement according to the RSRQ measurement type indicated by the base station, and the base station may report the RSRQ measurement type previously indicated to the UE to the network management side after receiving the RSRQ measurement result reported by the UE.

Moreover, the embodiment of the disclosure further provides a method for configuring the RSRQ measurement type by the network management side. With this method, the network management side, after receiving the RSRQ measurement result of the UE, may parse the RSRQ measurement result according to the RSRQ measurement type previously configured by the network management side, and may effectively perform network optimization according to the parsed RSRQ measurement result.

Obviously, with adoption of the embodiment of the disclosure, the network management side may correctly parse an actual meaning represented by the received RSRQ measurement result according to the RSRQ measurement type corresponding to the RSRQ measurement result after receiving the RSRQ measurement result, and effectively perform network optimization according to the RSRQ measurement result.

BRIEF DESCRIPTION OF THE DRAWINGS

The drawings are adopted to provide a further understanding to the disclosure, form a part of the specification of the disclosure, and are configured to explain the disclosure together with embodiments of the disclosure and not intended to limit the disclosure. In the drawings.

DETAILED DESCRIPTION

In order to make the purpose, technical solutions and advantages of embodiments of the disclosure clearer, the technical solutions in the embodiments of the disclosure will be clearly and completely described below with reference to the drawings in the embodiments of the disclosure. Obviously, the described embodiments are not all embodiments but a part of the embodiments of the disclosure. All other embodiments obtained by those skilled in the art on the basis of the embodiments in the disclosure without creative work shall fall within the scope of protection of the disclosure. Each embodiment may be mutually cited under the condition of no conflicts.

Embodiment 1

Description about RSRQ measurement of a UE which configures logged MDT configuration information in an idle state is provided in embodiment 1.

Figure 1:
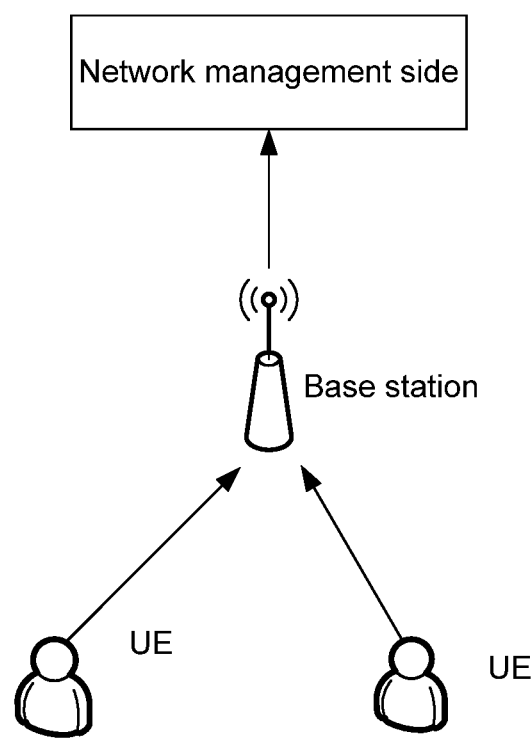
FIG. 1 is a schematic diagram of MDT.
Figure 2:
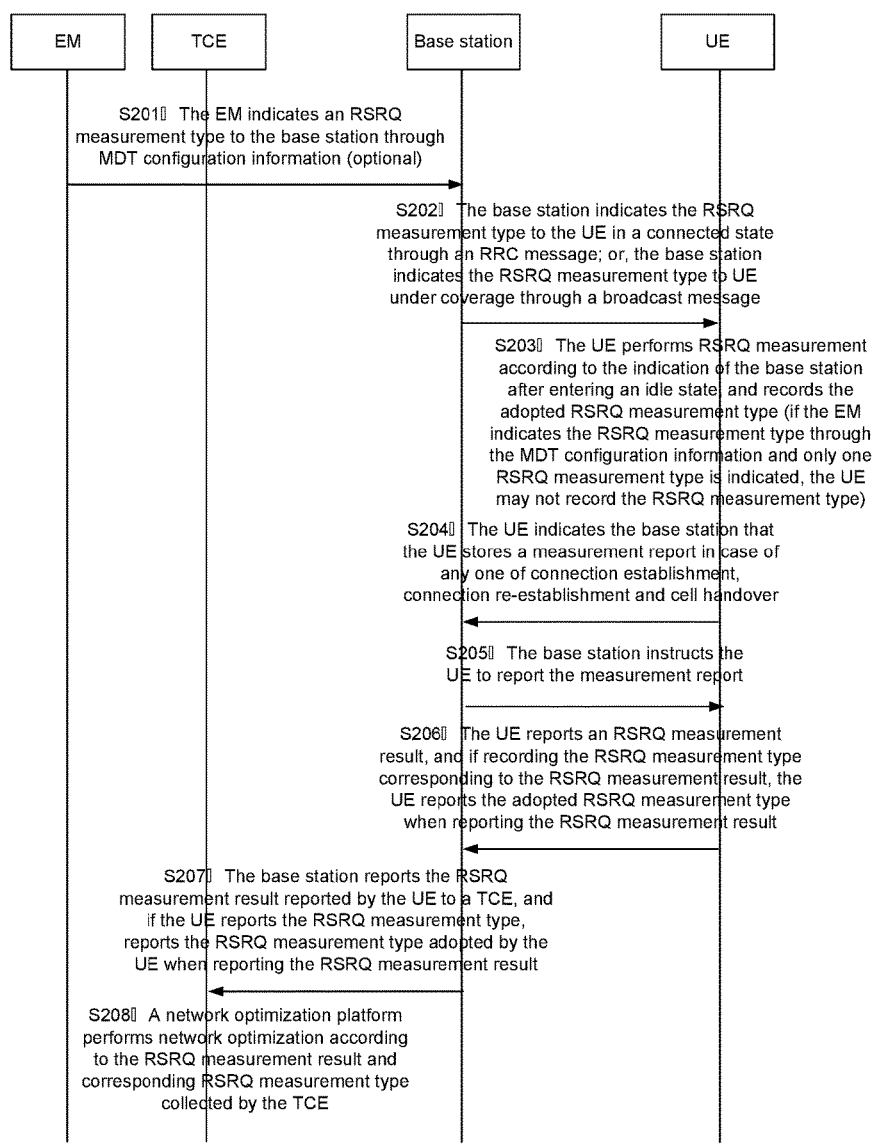
FIG. 2 is a flowchart of a method for performing RSRQ measurement according to embodiment 1 of the disclosure.

FIG. 2 is a flowchart of a method for performing RSRQ measurement according to embodiment 1 of the disclosure. The method includes the following steps.

In S201, a network-side Entity Management (EM) indicates an RSRQ measurement type to a base station through MDT configuration information (the step is optional).

In the step, the EM may carry the MDT configuration information in a trace session activation message for transmission to the base station. The message may be directly transmitted to the base station by the EM, or may be forwarded to the base station through a Home Subscriber Server (HSS) or a Mobility Management Entity (MME).

Here, the RSRQ measurement type includes a bandwidth type and/or a defined type. The bandwidth type includes wideband RSRQ and narrowband RSRQ, and the defined type includes conventionally-defined RSRQ and newly-defined RSRQ. In the conventionally-defined RSRQ, RSSI measurement is performed on the basis of an OFDM symbol which is received on an antenna port 0 and has a reference symbol, while in the newly-defined RSRQ, RSSI measurement is performed on the basis of all received OFDM symbols.

In the step, the EM may indicate the RSRQ measurement type in multiple information formats. For example:

Manner 1: the EM indicates the configured bandwidth type and defined type in a multibit Information Element (IE). For example, in an IE with 2 indication bits, the bandwidth type is indicated by a high bit of the IE, and the defined type is indicated by a low bit of the IE; or, the bandwidth type is indicated by the low bit, and the defined type is indicated by the high bit. For example, 01 or 10 is used to indicate a combination of the wideband RSRQ and the conventionally-defined RSRQ, or a combination of the narrowband RSRQ and the newly-defined RSRQ. 11 or 00 is used to indicate a combination of the wideband RSRQ and the newly-defined RSRQ, or indicate a combination of the narrowband RSRQ and the conventionally-defined RSRQ.

Manner 2: the EM indicates the configured bandwidth type and defined type through different IEs respectively. For example, the bandwidth type is indicated by a 1-bit IE, and the defined type is indicated by another 1-bit IE. During specific implementation, the defined type may be indicated in an IE nested in another IE which indicates the bandwidth type, or the bandwidth type may be indicated in an IE nested in another IE which indicates the defined type.

Manner 3: the EM indicates the configured RSRQ measurement type to be the combination of the wideband RSRQ and the newly-defined RSRQ through a single-bit IE, or, indicates the configured RSRQ measurement type to be a measurement type combining the narrowband RSRQ and the conventionally-defined RSRQ through a single-bit IE.

In such a manner, the wideband RSRQ is bound with the newly-defined RSRQ, and the narrowband RSRQ is bound with the conventionally-defined RSRQ. For example, the configured RSRQ measurement type is indicated to be a measurement type combining the wideband RSRQ and the newly-defined RSRQ, or to be a measurement type combining the narrowband RSRQ and the conventionally-defined RSRQ by using an IE with one indicator bit.

With connection to the abovementioned information formats, the EM may configure multiple measurement types for the UE, and may specifically issue them in a form of a measurement type list. The EM may further indicate (for example, implicitly indicate in a predetermined manner), in view of the fact that the abovementioned information format indicates that the RSRQ measurement type includes the wideband RSRQ and/or the newly-defined RSRQ, the UE may simultaneously use the measurement type combining the narrowband RSRQ and the conventionally-defined RSRQ for RSRQ measurement.

In S202, the base station indicates the RSRQ measurement type to the UE in a connected state through an RRC message; or, the base station indicates the RSRQ measurement type to the UE under coverage through a broadcast message.

In the step, the base station may instruct the UE to enable idle-state logged MDT through a LoggedMeasurementConfiguration message in the RRC message, and may indicate the RSRQ measurement type adopted for the logged MDT in the message. The base station may also indicate the RSRQ measurement type to all of the UEs under the coverage in a unified manner through the broadcast message.

An information format in which the base station indicates the RSRQ measurement type to the UE may include that: the bandwidth type and defined type adopted by the UE are indicated by a multibit IE; or, the bandwidth type and defined type adopted by the UE are indicated by different IEs respectively; or, the base station indicates that the RSRQ measurement type adopted by the UE is the combination of the wideband RSRQ and the newly-defined RSRQ through a single-bit IE, or indicates that the RSRQ measurement type adopted by the UE is the combination of the narrowband RSRQ and the conventionally-defined RSRQ through a single-bit IE. Specific implementation may refer to descriptions in S101, and will not be elaborated herein. Corresponding to an indication manner of the EM, the base station may indicate multiple measurement types to the UE, and may specifically transmit them in form of measurement type list. The base station may also indicate (for example, implicitly indicate in a predetermined manner) the UE to simultaneously adopt the measurement type combining the narrowband RSRQ and the conventionally-defined RSRQ for RSRQ measurement on the basis of indicating that the RSRQ measurement type includes the wideband RSRQ and/or the newly-defined RSRQ.

In addition, if S201 is executed, that is, the EM indicates the RSRQ measurement type, the base station may directly indicate the RSRQ measurement type to the UE. In addition, if the EM does not indicate the RSRQ measurement type, the base station may configure the RSRQ measurement type for the UE. The base station may configure the RSRQ measurement type within a range of a supporting capability of the UE for the UE according to the supporting capability of the UE, that is, the base station may consider the RSRQ measurement types that can be supported by different UEs when configuring the RSRQ measurement type for these UEs (specifically, whether each UE supports the wideband RSRQ and/or the newly-defined RSRQ or not is considered).

In S203, the UE performs RSRQ measurement according to an indication of the base station after entering an idle state, and records the adopted RSRQ measurement type (if the EM indicates the RSRQ measurement type through the MDT configuration information and only one RSRQ measurement type is indicated, the UE may not record the RSRQ measurement type).

In the step, the UE performs logged MDT recording after entering the idle state. Here, the UE determines that the RSRQ measurement type is the wideband RSRQ and/or the newly-defined RSRQ according to the indication of the RRC message (which may specifically be the LoggedMeasurementConfiguration message) or broadcast message transmitted by the base station. If the UE not only receives the RSRQ measurement type indicated by the base station through the RRC message, but also receives the RSRQ measurement type indicated by the base station through the broadcast message, the RSRQ measurement type received through the RRC message is adopted on the basis of a principle that a priority of indication of the RRC message is higher than that of indication of the broadcast message. The UE may adopt the information format similar to that adopted by the EM and the base station side when recording the RSRQ measurement type, which will not be elaborated herein.

In the step, if the UE adopts the measurement type combining the conventionally-defined RSRQ and the narrowband RSRQ, the measurement type may not be recorded, and the base station determines that the UE adopts the measurement type combining the conventionally-defined RSRQ and the narrowband RSRQ as a default after receiving an RSRQ measurement result of the UE. Or, if the EM indicates the RSRQ measurement type through the MDT configuration information in S101 and only one RSRQ measurement type is indicated, the UE may not record the RSRQ measurement type, and at this time, a TCE may parse the RSRQ measurement result according to the RSRQ measurement type configured by the EM after receiving the RSRQ measurement result.

In S204, the UE indicates the base station that the UE stores a measurement report in case of any one of connection establishment, connection re-establishment and cell handover.

In S205, the base station instructs the UE to report the measurement report.

In S206, the UE reports an RSRQ measurement result, and if the UE records the RSRQ measurement type corresponding to the RSRQ measurement result, the UE reports the adopted RSRQ measurement type when reporting the RSRQ measurement result.

In the step, the UE may report a LogMeasReport IE through an RRC message, and indicates the RSRQ measurement type in the LogMeasReport IE.

During specific implementation, if the UE records the adopted RSRQ measurement type when performing RSRQ measurement, the UE reports both the RSRQ measurement type and the measurement result under the RSRQ measurement type to the base station. if the MDT configuration information transmitted by the EM indicates the RSRQ measurement type and only one RSRQ measurement type is indicated, the UE may not record or report the RSRQ measurement type. Or, the UE does not report the RSRQ measurement type, and at this time, the base station determines that the UE adopts the measurement type combining the conventionally-defined RSRQ and the narrowband RSRQ as a default. An information format for indicating the RSRQ measurement type may specifically include that: the adopted bandwidth type and defined type are indicated by a multibit IE; or, the adopted bandwidth type and defined type are indicated by different IEs respectively; or, the adopted RSRQ measurement type is indicated to be the combination of the wideband RSRQ and the newly-defined RSRQ by a single-bit IE, or the adopted RSRQ measurement type is indicated to be the combination of the narrowband RSRQ and the conventionally-defined RSRQ by a single-bit IE. Specific implementation may refer to the above description, and will not be elaborated.

In S207, the base station reports the RSRQ measurement result reported by the UE to a TCE, and if the UE reports the RSRQ measurement type, reports the RSRQ measurement type adopted by the UE when reporting the RSRQ measurement result.

In the step, if the UE adopts the measurement type combining the conventionally-defined RSRQ and the narrowband RSRQ, the measurement type may not be reported, and after the base station reports the RSRQ measurement result of the UE, the TCE determines that the UE adopts the measurement type combining the conventionally-defined RSRQ and the narrowband RSRQ as a default. Or, if the RSRQ measurement type is configured by the EM, and there is only one RSRQ measurement type, the UE may not report the RSRQ measurement type, and correspondingly, the base station may also not report the RSRQ measurement type. The TCE, after receiving the RSRQ measurement result, may determine the RSRQ measurement type configured by the EM for a Trace Session Identifier (ID) corresponding to the RSRQ measurement result according to the Trace Session ID.

In S208, a network optimization platform (which is also referred to as a network manager) performs network optimization according to the RSRQ measurement result and corresponding RSRQ measurement type collected by the TCE.

In a specific implementation process, it may be determined whether a radio network parameter related to the RSRQ measurement type is required to be optimized or not according to the RSRQ measurement type corresponding to the RSRQ measurement result. Here, the radio network parameter includes a radio network parameter related to cell selection, cell reselection, cell handover or the like; here, not only a specific radio network parameter (such as q-QualiMinWB) corresponding to different RSRQ measurement types is included, but also another radio network parameter (such as Qqualminoffset, SIntraSearchQ and a measurement threshold related to RSRQ in a measurement event (such as events A1~A5, B1 and B2)) of which a value may be different for different RSRQ types is included. With the embodiment of the disclosure, after the RSRQ measurement type is identified, these radio network parameter values may be pertinently optimized. During specific implementation, for a different RSRQ measurement type, an offset may also be set for the radio network parameter, and when a different RSRQ measurement type is applied to cell selection, cell reselection, cell handover or the like, the set offset is added to an initially configured radio network parameter value at first, and then the radio network parameter value is adopted.

Embodiment 2

Description about RSRQ measurement of UE in a connected state are provided in embodiment 2.

Figure 3:
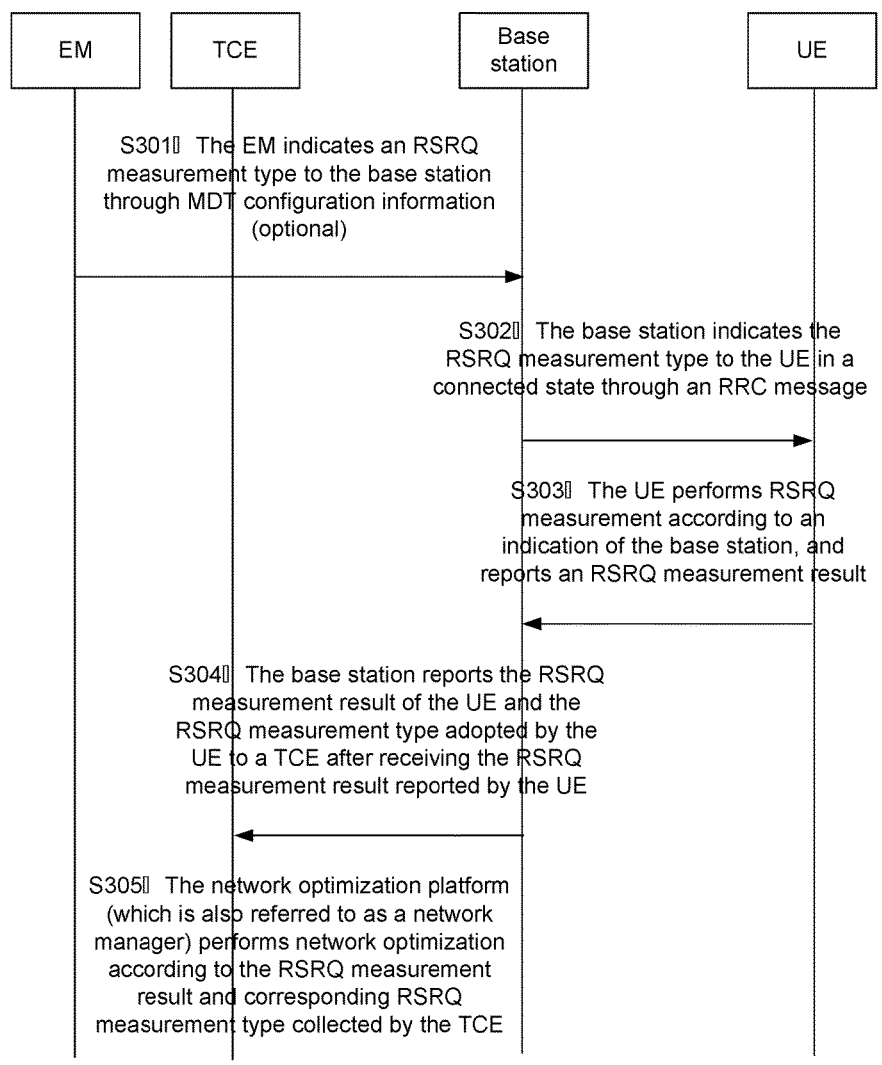
FIG. 3 is a flowchart of an RSRQ reporting method according to embodiment 2 of the disclosure.

FIG. 3 is a flowchart of an RSRQ reporting method according to embodiment 2 of the disclosure. The method includes the following steps.

In S301, an EM indicates an RSRQ measurement type to a base station through MDT configuration information (the step is optional).

Implementation of the step may refer to embodiment 1, and will not be elaborated herein.

In S302, the base station indicates the RSRQ measurement type to UE in a connected state through an RRC message.

In the step, the base station may instruct the UE in the connected state to enable Immediate MDT through the RRC message. If Step S301 is executed, that is, the EM indicates the RSRQ measurement type, the base station may directly indicate the RSRQ measurement type to the UE. If the EM does not indicate the RSRQ measurement type, the base station may configure the RSRQ measurement type for the UE. The base station may configure the RSRQ measurement type within the supporting capability of the UE for the UE according to the supporting capability of the UE, that is, the base station may consider RSRQ measurement types that different UEs can support when configuring the RSRQ measurement type for the UEs (specifically, whether each UE supports the wideband RSRQ and/or the newly-defined RSRQ or not is considered).

An information format in which the base station indicates the RSRQ measurement type may refer to the description in embodiment 1, and will not be elaborated herein.

In S303, the UE performs RSRQ measurement according to an indication of the base station, and reports an RSRQ measurement result.

In the step, the UE performs RSRQ measurement according to the RSRQ measurement type configured by the EM or the base station. During specific implementation, the UE may perform RSRQ measurement under multiple RSRQ measurement types, and record RSRQ measurement results under each RSRQ measurement type respectively, and then the UE reports the RSRQ measurement types and the RSRQ measurement results under each RSRQ measurement type.

In the step, when the UE adopts one RSRQ measurement type for RSRQ measurement, the RSRQ measurement type may not be recorded, and this is because: the UE performs RSRQ measurement and reporting in an RRC connected state with the base station, the base station where the UE resides does not change, and if the base station indicates only one RSRQ measurement type to the UE, the base station may identify the RSRQ measurement type adopted by the UE after receiving the RSRQ measurement result reported by the UE.

If the EM or the base station configures multiple RSRQ measurement types for the UE, the UE has to record each RSRQ measurement type and the measurement results under each RSRQ measurement type.

In S304, the base station reports the RSRQ measurement result of the UE and the RSRQ measurement type adopted by the UE to a TCE after receiving the RSRQ measurement result reported by the UE.

In the condition that there is only one RSRQ measurement type: if the EM does not indicate the RSRQ measurement type in the MDT configuration information, after the base station receives the RSRQ measurement result reported by the UE, the base station queries the RSRQ measurement type previously configured for the UE according to identification information of the UE, and records the RSRQ measurement type. The information format for recording may refer to the description in embodiment 1. If the UE does not adopt the measurement type of wideband RSRQ and/or newly-defined RSRQ, the base station may not record or report the RSRQ measurement type, and at this time, the TCE determines that the UE adopts a conventional RSRQ measurement type (i.e. the measurement type combining narrowband RSRQ and conventionally-defined RSRQ) as a default. Or, if the EM indicates the RSRQ measurement type in the MDT configuration information, the base station is not required to record or report the RSRQ measurement type, and the TCE, after receiving the RSRQ measurement result, may determine the RSRQ measurement type configured by the EM for a Trace Session ID corresponding to the RSRQ measurement result according to the Trace Session ID.

In the condition that there are multiple RSRQ measurement types, the base station directly reports each RSRQ measurement type recorded by the UE and measurement results under each RSRQ measurement type to the TCE.

In S305, a network optimization platform (which is also referred to as a network manager) performs network optimization according to the RSRQ measurement result and corresponding RSRQ measurement type collected by the TCE.

Specific implementation of the step may refer to the description in embodiment 1, and will not be elaborated herein.

In embodiment 1 and embodiment 2, if the base station configures that all of the UEs supporting the wideband RSRQ and/or the newly-defined RSRQ perform measurement according to the measurement type of the wideband RSRQ and/or the newly-defined RSRQ (that is, any UE which supports a new RSRQ measurement type performs measurement according to the new type) and the UE adopts only one RSRQ measurement type, the UE is not required to report the RSRQ measurement type, and the base station determines the RSRQ measurement type adopted by the UE according to the supporting capability of the UE.

Embodiment 3

Description about RSRQ measurement of UE in case of an RLF, a handover failure and a connection establishment failure is provided in embodiment 3.

Figure 4:
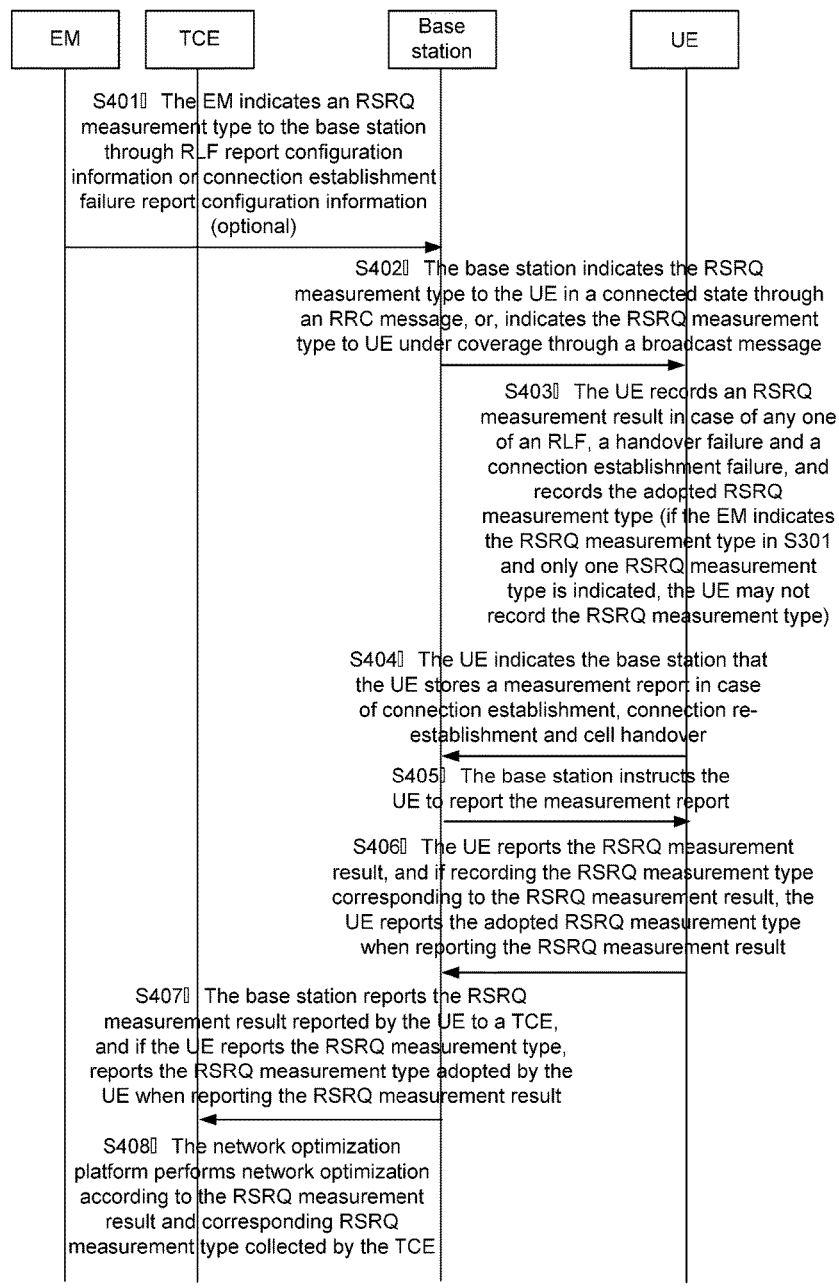
FIG. 4 is a flowchart of an RSRQ measurement method according to embodiment 3 of the disclosure.

FIG. 4 is a flowchart of an RSRQ measurement method according to embodiment 3 of the disclosure.

S401: an EM indicates an RSRQ measurement type to a base station through RLF report configuration information or connection establishment failure report configuration information (the step is optional).

In the step, the EM may carry the RLF report configuration information or the connection establishment failure report configuration information in a trace session activation message for transmission to the base station. The message may be directly transmitted to the base station by the EM, and may also be forwarded through an HSS or an MME.

An information format by which the EM indicates the RSRQ measurement type may refer to the descriptions in embodiment 1, and will not be elaborated herein.

S402: the base station indicates the RSRQ measurement type to UE in a connected state through an RRC message, or, indicates the RSRQ measurement type to UE under coverage through a broadcast message.

Specific implementation of the step may refer to embodiment 1. Similar to the abovementioned embodiment, if the EM indicates the RSRQ measurement type through the RLF report configuration information or the connection establishment failure report configuration information, the base station transmits the RSRQ measurement type indicated by the EM to the UE, and if the EM does not indicate the RSRQ measurement type, the base station configures the RSRQ measurement type for the UE by itself.

S403: the UE records an RSRQ measurement result in case of any one of an RLF, a handover failure and a connection establishment failure, and records the adopted RSRQ measurement type (if the EM indicates the RSRQ measurement type in S301 and only one RSRQ measurement type is indicated, the UE may not record the RSRQ measurement type).

In the step, the UE records related information in a corresponding variable, such as a connection establishment failure report (connEstFailReport) or an RLF report (RLFReport), in case of the connection establishment failure, the handover failure or the RLF, and here, the related information includes the RSRQ measurement result, and may also include the RSRQ measurement type. Specific conditions that the UE records or does not record the RSRQ measurement type are similar to the abovementioned embodiments. For example, when the EM indicates the RSRQ measurement type and only one is indicated, the RSRQ measurement may not be recorded; or, when the conventional RSRQ measurement type is adopted, the RSRQ measurement type may not be recorded. When the EM or the base station configures multiple RSRQ measurement types, it is necessary to record each RSRQ measurement type and RSRQ measurement results under each RSRQ measurement type. An information format by which the UE records the RSRQ measurement type may refer to the descriptions in the abovementioned embodiments, and will not be elaborated herein.

S404: the UE indicates the base station that the UE stores a measurement report in case of connection establishment, connection re-establishment and cell handover.

S405: the base station instructs the UE to report the measurement report.

S406: the UE reports the RSRQ measurement result, and if recording the RSRQ measurement type corresponding to the RSRQ measurement result, the UE reports the adopted RSRQ measurement type when reporting the RSRQ measurement result.

Implementation of the step may specifically refer to the descriptions in embodiment 1, and will not be elaborated herein.

S407: the base station reports the RSRQ measurement result reported by the UE to a TCE, and if the UE reports the RSRQ measurement type, reports the RSRQ measurement type adopted by the UE when reporting the RSRQ measurement result.

In the step, if the UE adopts the measurement type combining the conventionally-defined RSRQ and the narrowband RSRQ, the measurement type may not be reported, and after the base station reports the RSRQ measurement result of the UE, the TCE determines that the UE adopts the measurement type combining the conventionally-defined RSRQ and the narrowband RSRQ as a default. Or, if the RSRQ measurement type is indicated by the EM, and only one is indicated, the UE is not required to report the RSRQ measurement type, and correspondingly, the base station may also not report the RSRQ measurement type. The TCE may determine the RSRQ measurement type configured by the EM for a Trace Session ID according to the Trace Session ID corresponding to the RSRQ measurement result after receiving the RSRQ measurement result.

S408: a network optimization platform (or called a network manager) performs network optimization according to the RSRQ measurement result and corresponding RSRQ measurement type collected by the TCE.

Specific implementation of the step may refer to the descriptions in embodiment 1, and will not be elaborated herein.

Based on the same inventive concept, the embodiment of the disclosure further provides an RSRQ reporting device corresponding to the RSRQ reporting method. A principle for the device for solve the problem is similar to the RSRQ reporting method of the embodiment of the disclosure, so that implementation of the device may refer to implementation of the method, and repeated parts will not be elaborated herein.

Figure 5:
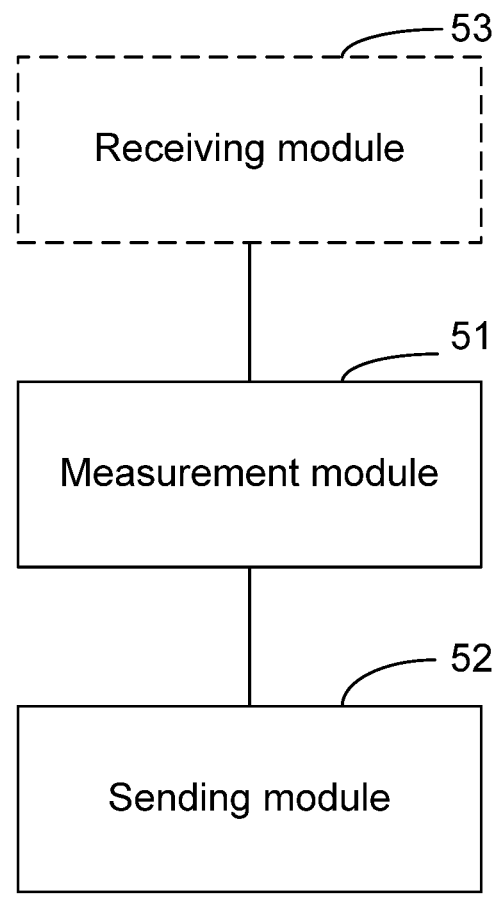
FIG. 5 is a structure diagram of an RSRQ reporting device according to embodiment 4 of the disclosure.

FIG. 5 is a structure diagram of an RSRQ reporting device according to embodiment 4 of the disclosure. The device includes:

a measurement module 51, configured to perform RSRQ measurement, and record an adopted RSRQ measurement type; and a sending module 52, configured to report the adopted RSRQ measurement type and an RSRQ measurement result under the RSRQ measurement type.

Optionally, the RSRQ measurement type includes a bandwidth type and/or a defined type, wherein the bandwidth type includes wideband RSRQ and narrowband RSRQ, the defined type includes conventionally-defined RSRQ and newly-defined RSRQ, RSSI measurement is performed on the basis of an OFDM symbol which is received on an antenna port 0 and has a reference symbol in the conventionally-defined RSRQ, and RSSI measurement is performed on the basis of all received OFDM symbols in the newly-defined RSRQ.

Optionally, the RSRQ measurement type includes a bandwidth type and a defined type; and the sending module is specifically configured to:

indicate the adopted bandwidth type and defined type by a multibit IE; or, indicate the adopted bandwidth type and defined type by different IEs respectively; or indicate that the adopted RSRQ measurement type is a combination of the wideband RSRQ and the newly-defined RSRQ by a single-bit IE, or, indicate that the adopted RSRQ measurement type is a combination of the narrowband RSRQ and the conventionally-defined RSRQ by a single-bit IE.

Optionally, the device further includes:

a receiving module 53, configured to receive the RSRQ measurement type indicated by the base station through an RRC message; and/or, receive the RSRQ measurement type indicated by the base station through a broadcast message.

Optionally, the measurement module 51 is specifically configured to:

record the adopted RSRQ measurement type according to received logged MDT configuration information when the RSRQ measurement result is recorded in an idle state.

Optionally, the sending module 52 is specifically configured to:

report a logMeasReport IE through an RRC message, and indicate the RSRQ measurement type in the logMeasReport IE.

Optionally, the measurement module 51 is specifically configured to:

record the RSRQ measurement result in case of any one of an RLF, a handover failure and a connection establishment failure, and record the adopted RSRQ measurement type.

Optionally, the measurement module 51 is specifically configured to:

perform RSRQ measurement under multiple RSRQ measurement types, and record RSRQ measurement results under each RSRQ measurement type respectively.

Figure 6:
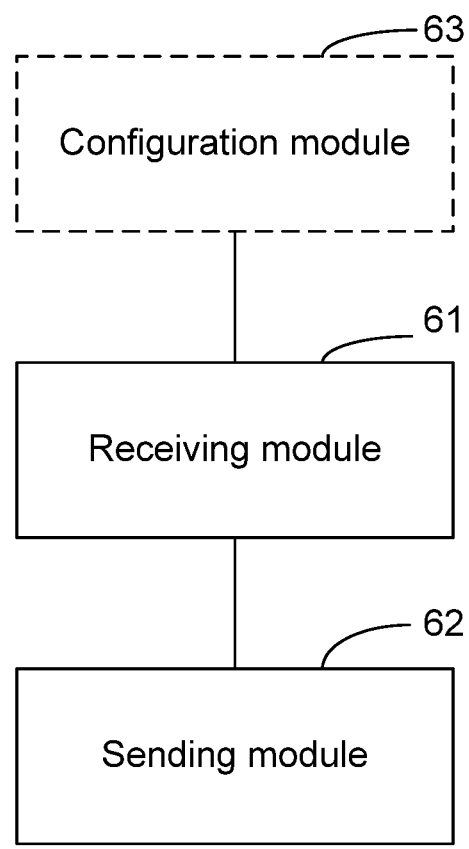
FIG. 6 is a structure diagram of an RSRQ reporting device according to embodiment 5 of the disclosure.

FIG. 6 is a structure diagram of an RSRQ reporting device according to embodiment 5 of the disclosure. The device includes:

a receiving module 61, configured to receive an RSRQ measurement result reported by UE; and a sending module 62, configured to report the RSRQ measurement result reported by the UE and an RSRQ measurement type adopted by the UE to a TCE.

Optionally, the RSRQ measurement type includes a bandwidth type and/or a defined type, wherein the bandwidth type includes wideband RSRQ and narrowband RSRQ, the defined type includes conventionally-defined RSRQ and newly-defined RSRQ, RSSI measurement is performed on the basis of an OFDM symbol which is received on an antenna port 0 and has a reference symbol in the conventionally-defined RSRQ, and RSSI measurement is performed on the basis of all received OFDM symbols in the newly-defined RSRQ.

Optionally, the RSRQ measurement type includes a bandwidth type and a defined type; and the sending module 62 is specifically configured to:

indicate the bandwidth type and defined type adopted by the UE by a multibit IE; or, indicate the bandwidth type and defined type adopted by the UE by different IEs respectively; or indicate that the RSRQ measurement type adopted by the UE is a combination of the wideband RSRQ and the newly-defined RSRQ by a single-bit IE, or, indicate that the RSRQ measurement type adopted by the UE is a combination of the narrowband RSRQ and the conventionally-defined RSRQ by a single-bit IE.

Optionally, the sending module 62 is further configured to, before the receiving module receives the RSRQ measurement result reported by the UE, indicate the RSRQ measurement type to the UE in a connected state through an RRC message; and/or, indicate the RSRQ measurement type to UE under coverage through a broadcast message.

Optionally, the sending module 62 is further configured to, if the RSRQ measurement type is sent to the UE in the connected state through the RRC message, report the RSRQ measurement result reported by the UE and the RSRQ measurement type indicated to the UE before to the TCE.

Optionally, the receiving module 61 is specifically configured to:

receive the RSRQ measurement type reported by the UE and the RSRQ measurement result under the RSRQ measurement type.

Optionally, the device further includes:

a configuration module 63, configured to, before the receiving module receives the RSRQ measurement result reported by the UE, configure the RSRQ measurement type of the UE; or, the receiving module 61 is further configured to:

before the receiving module receives the RSRQ measurement result reported by the UE, receive the RSRQ measurement type transmitted by a network EM.

Optionally, the receiving module 61 is specifically configured to:

receive MDT configuration information including the RSRQ measurement type from the EM; or, receive RLF report configuration information or connection establishment failure report configuration information including the RSRQ measurement type from the EM.

Figure 7:
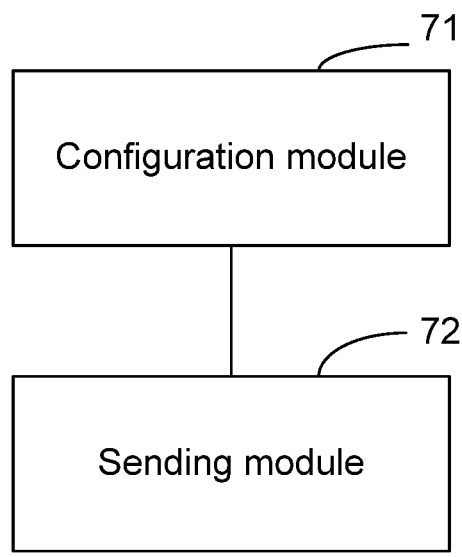
FIG. 7 is a structure diagram of an RSRQ reporting device according to embodiment 6 of the disclosure.

FIG. 7 is a structure diagram of an RSRQ reporting device according to embodiment 6 of the disclosure. The device includes:

a configuration module 71, configured to configure an RSRQ measurement type; and a sending module 72, configured to indicate the configured RSRQ measurement type to a base station for the base station to indicate to UE.

Optionally, the RSRQ measurement type includes a bandwidth type and/or a defined type, wherein the bandwidth type includes wideband RSRQ and narrowband RSRQ, the defined type includes conventionally-defined RSRQ and newly-defined RSRQ, RSSI measurement is performed on the basis of an OFDM symbol which is received on an antenna port 0 and has a reference symbol in the conventionally-defined RSRQ, and RSSI measurement is performed on the basis of all received OFDM symbols in the newly-defined RSRQ.

Optionally, the RSRQ measurement type includes a bandwidth type and/or a defined type; and the sending module 72 is specifically configured to:

indicate the configured bandwidth type and defined type by a multibit IE; or, indicate the configured bandwidth type and defined type by different IEs respectively; or indicate that the configured RSRQ measurement type is a combination of the wideband RSRQ and the newly-defined RSRQ by a single-bit IE, or, indicate that the configured RSRQ measurement type is a combination of the narrowband RSRQ and the conventionally-defined RSRQ by a single-bit IE.

Optionally, the sending module 72 is specifically configured to:

indicate the RSRQ measurement type to the base station through MDT configuration information; or, indicate the RSRQ measurement type to the base station through RLF report configuration information or connection establishment failure report configuration information.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-readable storage media (including, but not limited to, a disk memory, a Compact Disc Read-Only Memory (CD-ROM) and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the preferred embodiments of the disclosure have been described, those skilled in the art may make additional variations and modifications to these embodiments once knowing the basic creative concept. Therefore, the appended claims are intended to be explained to include the preferred embodiments and all the variations and modifications falling within the scope of disclosure.

Obviously, those skilled in the art may make various modifications and transformations to the embodiments of the disclosure without departing from the spirit and scope of the embodiments of the disclosure. Therefore, if these modifications and transformations of the embodiments of the disclosure fall within the scope of the claims of the disclosure and its equivalent technology, the disclosure is intended to include these modifications and transformations.

The invention claimed is:

1. A Reference Signal Receiving Quality (RSRQ) reporting method, comprising:
    Performing, by a User Equipment (UE), RSRQ measurement;
    Recording, by the UE, an adopted RSRQ measurement type for the RSRQ measurement; and
    Reporting, by the UE, the adopted RSRQ measurement type and an RSRQ measurement result under the RSRQ measurement type to a base station,
    wherein the RSRQ measurement type comprises at least one of a bandwidth type or a defined type, wherein the bandwidth type comprises wideband RSRQ and narrowband RSRQ, the defined type comprises pre-defined RSRQ and newly-defined RSRQ, and
    wherein the RSRQ measurement type comprises the bandwidth type and the defined type, and wherein reporting the adopted RSRQ measurement type comprises:
    indicating the adopted bandwidth type and defined type by a multibit Information Element (IE); or,
    indicating the adopted bandwidth type and defined type by different IEs respectively; or indicating that the adopted RSRQ measurement type is a combination of the wideband RSRQ and the newly-defined RSRQ by a single-bit IE, or, indicating that the adopted RSRQ measurement type is a combination of the narrowband RSRQ and the pre-defined RSRQ by a single-bit IE.

2. The method according to claim 1, wherein in the pre-defined RSRQ, Received Signal Strength Indicator (RSSI) measurement is performed on the basis of an Orthogonal Frequency Division Multiplexing (OFDM) symbol which is received on an antenna port 0 and has a reference symbol, and in the newly-defined RSRQ, RSSI measurement is performed on the basis of all received OFDM symbols.

3. The method according to claim 1, wherein before performing RSRQ measurement, the method further comprises at least one of:
receiving the RSRQ measurement type indicated by the base station through a Radio Resource Control (RRC) message; or,
receiving the RSRQ measurement type indicated by the base station through a broadcast message.

4. The method according to claim 1, wherein performing RSRQ measurement and recording the adopted RSRQ measurement type comprises:
recording the adopted RSRQ measurement type according to received logged Minimization of Drive Test (MDT) configuration information when the RSRQ measurement result is recorded in an idle state.

5. The method according to claim 1, wherein reporting the adopted RSRQ measurement type comprises:
reporting a logged measurement report (logMeasReport) IE through an RRC message, and
indicating the RSRQ measurement type in the logMeasReport IE.

6. The method according to claim 1, wherein performing RSRQ measurement and recording the adopted RSRQ measurement type comprises:
recording the RSRQ measurement result in case of any one of a Radio Link Failure (RLF), a handover failure and a connection establishment failure, and
recording the adopted RSRQ measurement type.

7. A Reference Signal Receiving Quality (RSRQ) reporting method, comprising:
receiving, by a base station, an RSRQ measurement result reported by a User Equipment (UE); and
reporting, by the base station, the RSRQ measurement result reported by the UE and an RSRQ measurement type adopted by the UE to a Trace Collection Entity (TCE),
wherein the RSRQ measurement type comprises at least one of a bandwidth type or a defined type, wherein the bandwidth type comprises wideband RSRQ and narrowband RSRQ, the defined type comprises pre-defined RSRQ and newly-defined RSRQ, and
wherein the RSRQ measurement type comprises the bandwidth type and the defined type; and wherein the reporting the RSRQ measurement type adopted by the UE to the TCE comprises:
indicating the bandwidth type and defined type adopted by the UE by a multibit Information Element (IE); or,
indicating the bandwidth type and defined type adopted by the UE by different IEs respectively; or
indicating that the RSRQ measurement type adopted by the UE is a combination of the wideband RSRQ and the newly-defined RSRQ by a single-bit IE, or, indicating that the RSRQ measurement type adopted by the UE is a combination of the narrowband RSRQ and the pre-defined RSRQ by a single-bit IE.

8. The method according to claim 7, wherein in the pre-defined RSRQ, Received Signal Strength Indicator (RSSI) measurement is performed on the basis of an Orthogonal Frequency Division Multiplexing (OFDM) symbol which is received on an antenna port 0 and has a reference symbol, and in the newly-defined RSRQ, RSSI measurement is performed on the basis of all received OFDM symbols.

9. The method according to claim 7, wherein before receiving the RSRQ measurement result reported by the UE, the method further comprises at least one of:
indicating the RSRQ measurement type to the UE in a connected state through a Radio Resource Control (RRC) message; or, indicating the RSRQ measurement type to UE under coverage through a broadcast message.

10. The method according to claim 9, wherein, in the case that the RSRQ measurement type is sent to the UE in the connected state through the RRC message, reporting the RSRQ measurement result reported by the UE and the RSRQ measurement type adopted by the UE to the TCE comprises:
reporting the RSRQ measurement result reported by the UE and the RSRQ measurement type indicated to the UE before to the TCE.

11. The method according to claim 7, wherein receiving the RSRQ measurement result reported by the UE comprises:
receiving the RSRQ measurement type reported by the UE and the RSRQ measurement result under the RSRQ measurement type.

12. A Reference Signal Receiving Quality (RSRQ) reporting device, comprising a processor and a memory for storing instructions executable by the processor, wherein the processor comprises:
a measurement module, configured to perform RSRQ measurement, and record an adopted RSRQ measurement type for the RSRQ measurement; and
a sending module, configured to report the adopted RSRQ measurement type and an RSRQ measurement result under the RSRQ measurement type to a base station,
wherein the RSRQ measurement type comprises at least one of a bandwidth type or a defined type, wherein the bandwidth type comprises wideband RSRQ and narrowband RSRQ, the defined type comprises pre-defined RSRQ and newly-defined RSRQ, and
wherein the RSRQ measurement type comprises the bandwidth type and the defined type; and wherein the sending module is specifically configured to:
indicate the adopted bandwidth type and defined type by a multibit Information Element (IE); or,
indicate the adopted bandwidth type and defined type by different IEs respectively; or
indicate that the adopted RSRQ measurement type is a combination of the wideband RSRQ and the newly-defined RSRQ by a single-bit IE, or, indicate that the adopted RSRQ measurement type is a combination of the narrowband RSRQ and the pre-defined RSRQ by a single-bit IE.

13. The device according to claim 12, wherein in the pre-defined RSRQ, Received Signal Strength Indicator (RSSI) measurement is performed on the basis of an Orthogonal Frequency Division Multiplexing (OFDM) symbol which is received on an antenna port 0 and has a reference symbol, and in the newly-defined RSRQ, RSSI measurement is performed on the basis of all received OFDM symbols.

14. The device according to claim 12, the processor further comprising:
a receiving module, configured to receive the RSRQ measurement type indicated by the base station through at least one of a Radio Resource Control (RRC) message or a broadcast message.

15. The device according to claim 12, wherein the measurement module is specifically configured to:
record the adopted RSRQ measurement type according to received logged Minimization of Drive Test (MDT) configuration information when the RSRQ measurement result is recorded in an idle state.

16. The device according to claim 12, wherein the sending module is specifically configured to:
report a logged measurement report (logMeasReport) IE through an RRC message, and indicate the RSRQ measurement type in the logMeasReport IE.

17. The device according to claim 12, wherein the measurement module is specifically configured to:
record the RSRQ measurement result in case of any one of a Radio Link Failure (RLF), a handover failure and a connection establishment failure, and recording the adopted RSRQ measurement type.

* * * * *